United States Patent
Zhang et al.

(10) Patent No.: US 9,432,881 B2
(45) Date of Patent: Aug. 30, 2016

(54) METHOD AND APPARATUS FOR LOAD BALANCING IN CELLULAR COMMUNICATION SYSTEMS

(75) Inventors: Xiaoyu Zhang, Guangdong (CN); Qian Sun, Guangdong (CN)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 14 days.

(21) Appl. No.: 14/378,106

(22) PCT Filed: Feb. 29, 2012

(86) PCT No.: PCT/CN2012/071798
§ 371 (c)(1),
(2), (4) Date: Aug. 12, 2014

(87) PCT Pub. No.: WO2013/127079
PCT Pub. Date: Sep. 6, 2013

(65) Prior Publication Data
US 2015/0011232 A1    Jan. 8, 2015

(51) Int. Cl.
*H04W 72/00*    (2009.01)
*H04W 28/08*    (2009.01)
*H04W 16/08*    (2009.01)

(52) U.S. Cl.
CPC .......... *H04W 28/085* (2013.01); *H04W 16/08* (2013.01)

(58) Field of Classification Search
CPC .............................. H04W 28/08; H04W 24/02
USPC ....................................................... 455/453
See application file for complete search history.

(56) References Cited

U.S. PATENT DOCUMENTS

| 2005/0176419 A1 | 8/2005 | Triolo et al. |
| 2006/0068849 A1 | 3/2006 | Bernhard et al. |
| 2008/0057933 A1 | 3/2008 | Brunner |

FOREIGN PATENT DOCUMENTS

| CN | 1351806 | 5/2002 | |
| SE | WO 0072618 A1 * | 11/2000 | ............ H04W 16/06 |

OTHER PUBLICATIONS

International Search Report for International Application No. PCT/CN2012/071798, Dec. 13, 2012.
"On Cell Breathing in CDMA Networks" by A. Jalali; Nortel Wireless Networks, 1998.
"A Dynamic Load Sharing Algorithm Through Power Control in Cellular CDMA" by James X. Qiu and Jon W. Mark; Centre for Wireless Communications, Department of Electrical and Computer Engineering, Jul. 1998.
PCT Notification Concerning Transmittal of International Preliminary Report on Patentability (Chapter I of the Patent Cooperation Treaty) for International application No. PCT/CN2012/071798, Sep. 2, 2014.

* cited by examiner Thomas Lett

(74) *Attorney, Agent, or Firm* — Patents on Demand P.A.; Brian K. Buchheit; Scott M. Garrett (57) ABSTRACT

The present invention generally relates to cellular communication systems. More specifically, the present invention relates to load balancing in cellular communication systems. A method for load balancing in a cellular communication system comprise: receiving forward link load conditions in an area covered by a first sector and at least one second sector adjacent to the first sector, wherein the first and the second sectors belong to different cells; if it is determined that a distribution of the forward link load conditions deviates from a predetermined equilibrium, adjusting coverages of the first and the second sectors to make the distribution move toward the predetermined equilibrium.

10 Claims, 6 Drawing Sheets

METHOD AND APPARATUS FOR LOAD BALANCING IN CELLULAR COMMUNICATION SYSTEMS

PRIORITY

This nonprovisional application is a U.S. National Stage Filing under 35 U.S.C. §371 of International Patent Application Serial No. PCT/CN2012/071798, filed Feb. 29, 2012 and entitled "Method and Apparatus for Load Balancing in Cellular Communication Systems."

TECHNICAL FIELD

The present invention generally relates to cellular communication systems. More specifically, the present invention relates to load balancing in cellular communication systems.

BACKGROUND

Cellular communication networks divide the geographical area into smaller regions or cells. Often, traffic distribution is non-uniform in a cellular network and thus load balancing is necessarily carried out to have a tradeoff between cell coverage and cell capacity.

Various load balancing schemes have been proposed to assign resources to the cells such that the available channels are efficiently used. Among them, cell breathing is a mechanism that attempts to keep the forward and reverse link handoff boundaries balanced by changing the forward link (FL) coverage according to the changes in the reverse link (RL) interference level. For example, when one cell has heavy traffic, it shrinks and its neighbor cell(s) expand, whereby the user terminals (UTs) at the cell boundaries can transfer to the light-loaded neighbor cells. In such a way, the performance of the whole network is enhanced.

By adjusting the pilot power, the size of cell or cell coverage will change accordingly. For FL coverage, the adjusting is typically determined based on SNR of pilot signal received from a base station (BS), e.g., Eb/No, where Eb is the bit energy of pilot signal and No is the spectral density of total interference. As for RL coverage, it is substantially influenced by rise over thermal (ROT). Within a first cell, one UT at cell edge may be influenced due to interference from other UT(s) served by a second cell and under such circumstance, RL coverage shrinks to guarantee QoS at an acceptable level. For details, please refer to U.S. patent application Ser. No. 11/469,036, which describes method and system for adaptive modification of cell boundary and is incorporated herein by reference, and "On Cell Breathing in CDMA Networks", A. Jalali, IEEE 1998, which provide an assessment of the capabilities of Cell Breathing in optimal CDMA network management and is incorporated herein by reference.

However, with the deployment of novel technology such as RLIC (Reverse Link Interference Cancellation) and 4BRD (4-Branch Receive Diversity) in cellular radio communication systems, new load balancing schemes become necessary.

SUMMARY OF THE INVENTION

In light of the above, one of the objects of the present invention is to provide a solution for load balancing which adapts to cellular communication systems with novel technology.

According to one aspect of the present invention, a method for load balancing in a cellular communication system, comprising:
  receiving forward link load conditions in an area covered by a first sector and at least one second sector adjacent to the first sector, wherein the first and the second sectors belong to different cells;
  if it is determined that a distribution of the forward link load conditions deviates from a predetermined equilibrium, adjusting coverages of the first and the second sectors to make the distribution move toward the predetermined equilibrium.

In the above-mentioned method, the balancing may be triggered depending on the forward link load conditions. This is advantageous under the situation where RL performance outperforms FL performance.

In a preferred embodiment according to the present invention, wherein the forward link load conditions are represented by resources available for setting up a call by base stations in the first and the second sectors. More preferably, the resources are associated with at least one of the following aspects: channel element (CE), quasi-orthogonal function (QoF) codes, or base station power in the first and the second sectors.

In a preferred embodiment according to the present invention, wherein:
  it is determined that the distribution of the forward link load conditions deviates from the predetermined equilibrium if the first sector has an availability of the resources being less than a first threshold and each of the second sector has an availability of the resources being greater than a second threshold; and
  adjusting coverages of the first and the second sectors comprises: shrinking the coverage of the first sector and expanding the coverage of the second sector not overlapped with the first sector until the availability of the resources for the first sector is greater than the first threshold or until each of the second sector has an availability of the resources being equal or less than a third threshold.

In the adjusting step of the above-mentioned preferred embodiment, the expanding is performed on the second sector not overlapped with the first sector and thus prevents the formation of a coverage hole.

In a preferred embodiment according to the present invention, the method further comprising:
  if the availability of the resources for the first sector returns above a fourth threshold and the coverage of the first sector is less than an initial range, expanding the coverage of the first sector and shrinking the coverage of the second sector.

In the above-mentioned preferred embodiment, when the distribution of the forward link load conditions return to the equilibrium, the shrinking is performed on the second sector and thus improves efficiency of resources usage.

According to another aspect of the present invention, an apparatus for load balancing in a cellular communication system, comprising:
  a communicating unit configured to receive forward link load conditions in an area covered by a first sector and at least one second sector adjacent to the first sector, wherein the first and the second sectors belong to different cells;
  an adjusting unit configured to adjust coverages of the first and the second sectors to make a distribution of the forward link load conditions move toward the predetermined equilibrium if the distribution deviates from a predetermined equilibrium.

In a preferred embodiment according to the present invention, wherein the apparatus further comprising:

a determining unit configured to determine if the distribution of the forward link load conditions deviates from the predetermined equilibrium.

In a preferred embodiment according to the present invention, wherein:

the determining unit is configured to determine that the distribution of the forward link load conditions deviates from the predetermined equilibrium if the first sector has an availability of the resources being less than a first threshold and each of the second sector has an availability of the resources being greater than a second threshold; and the adjusting unit is configured to shrink the coverage of the first sector and expand the coverage of the second sector not overlapped with the first sector until the availability of the resources for the first sector is greater than the first threshold or until each of the second sector has an availability of the resources being equal or less than a third threshold.

In a preferred embodiment according to the present invention, wherein the adjusting unit is further configured to expand the coverage of the first sector and shrink the coverage of the remaining second sector if the availability of the resources for the first sector returns above a fourth threshold and the coverage of the first sector is less than an initial range.

BRIEF DESCRIPTION OF THE DRAWINGS

The foregoing and other objects, features, and advantages of the present invention will be apparent from the following more particular description of preferred embodiments as illustrated in the accompanying drawings in which.

DETAILED DESCRIPTION

While the invention covers various modifications and alternative constructions, embodiments of the invention are shown in the drawings and will hereinafter be described in detail. However, it should be understood that the specific description and drawings are not intended to limit the invention to the specific forms disclosed. On the contrary, it is intended that the scope of the claimed invention includes all modifications and alternative constructions thereof falling within the scope of the invention as expressed in the appended claims.

Unless defined in the context of the present description, otherwise, all technical and scientific terms used herein have the same meaning as commonly understood by one of ordinary skill in the art to which this invention belongs.

Figure 1A:
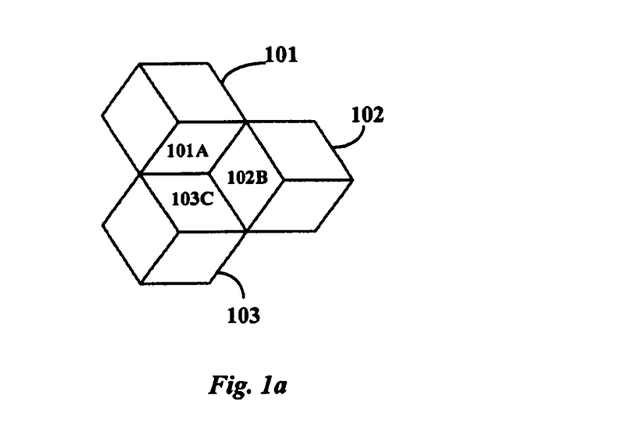
FIG. 1a illustrates a portion of an exemplary cellular communication network.
Figure 1B:
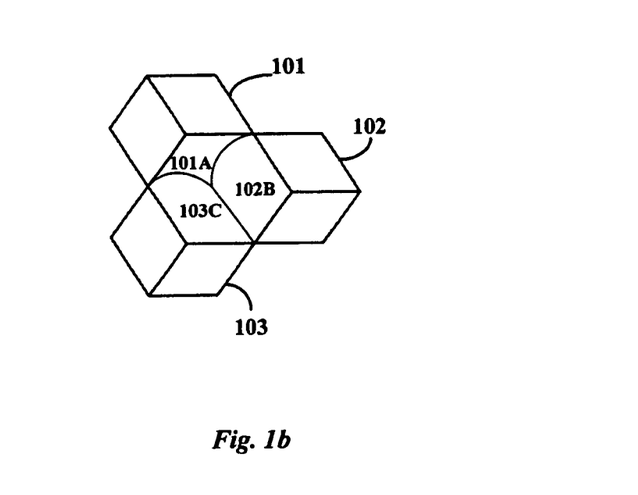
FIG. 1b illustrates the portion of the exemplary cellular communication network as shown in FIG. 1a, where the coverages of sectors have been adjusted.

For illustrative purpose, the following embodiments are described in the context of the exemplary cellular communication network as shown in FIGS. 1a and 1b. However, one skilled artisan in the art would recognize that the present invention is applicable to any cellular communication system, such as GSM, WCDMA, CDMA, TD-CDMA and LTE systems.

A cellular communication network is typically comprised of a plurality of cells, each of which has an associated base station (BS) providing access to the cellular network to a plurality of UTs within the cell. A BS may have a plurality of antennas, e.g., three antennas, oriented in different directions, whereby defining a plurality of sectors respectively. A base station controller (BSC) is coupled to a plurality of BSs for serving them. FIG. 1a illustrates a portion of an exemplary cellular communication network, which is covered by three cells 101, 102 and 103. Referring to FIG. 1a, these cells are adjacent to each other and each of them comprises of three sectors. Moreover, sectors 101A, 102B and 103C constitute a set of adjacent sectors. However, the topography as shown therein is only for illustrative purpose. For example, in another scenario, cells 102 and 103 may be separated from each other but adjacent to cell 101. Moreover, the set may include a plurality of adjacent sectors other than three.

In a cellular communication system, typically, a BS communicates with each UT using a separate temporary radio channel, which is a set of two connections, the downlink, for transmitting to the UT and the uplink, for receiving from the UT. When a UT enters operational state, it establishes communication with the BS having the strongest pilot Eb/No or a set of BSs whose pilot Eb/No are above a certain threshold. In other words, the sector coverage is primarily determined by the pilot signal strength or pilot power transmitted from the BS. Therefore, by adjusting the pilot power, the sector coverage will change accordingly.

Assuming that in the portion as shown in FIG. 1a, sector 101A is in a heavy-load condition and thus is termed as a busy sector, and sectors 102B and 103C are in a light-load condition. As shown in FIG. 1b, in order to mitigate the load condition of sector 101A, the coverage for this sector shrinks. Meanwhile, the coverages for sectors 102B and 103C expand to cover the area where sector 101A retreats. As a result, the UTs at the edge of sector 101A may handover (e.g. soft handoff) to sectors 102B and 103C. In other words, the load of the busy sector is partially pushed to its neighbor sectors.

Figure 2:
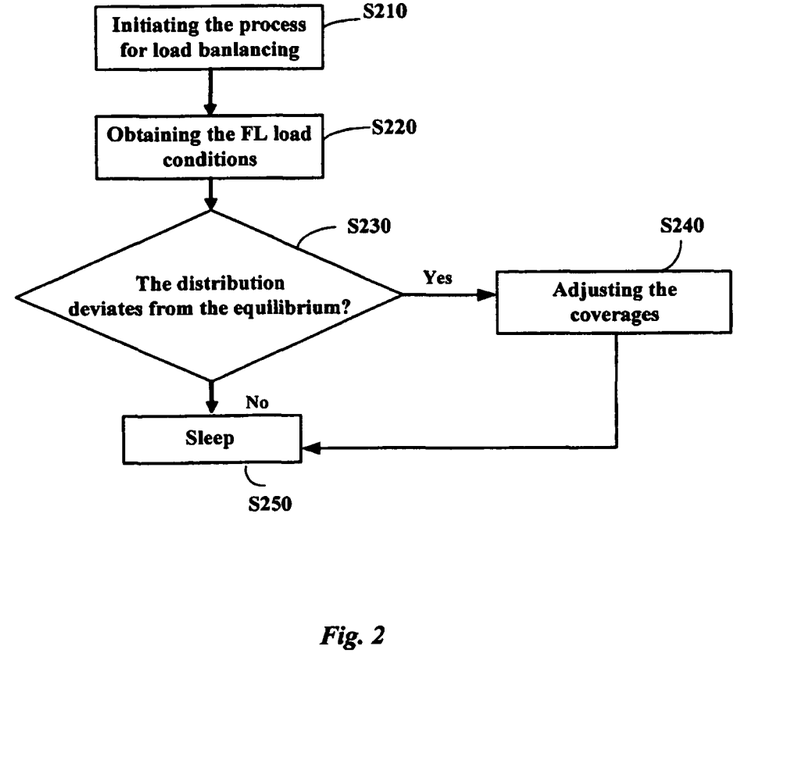
FIG. 2 is a process flow diagram of a method for load balancing according to one exemplary embodiment of the present invention.

FIG. 2 is a process flow diagram of a method for load balancing according to one exemplary embodiment of the present invention.

In the following description, considering that a BSC (base station controller) has the knowledge of cell topography (e.g., size and shape, or boundary) over the cellular communication network, it is configured to be responsible for load balancing, e.g., deciding when and how to tune the pilot power for each of the sectors. However, those decisions may be also made at other entities or nodes which have the same or similar knowledge, such as eNodeB in LTE system.

With reference to FIG. 2, at step S210, a BSC initiates the process for load balancing. In the present embodiment, the initiation is triggered by the event that a timer, e.g., T_range_tune timer as shown in FIG. 2, times out. At this step, BSC initializes parameters for a set of adjacent sectors, e.g., sectors 101A, 102B and 103C in FIGS. 1a and 1b, and resets the timer. As an example, the parameters may include: (1) r_i_init for representing the initial size of the $i^{th}$ sector in the set, i=1, 2, ... N, where N is the number of the sectors in the set; (2) overlap_i,j for indicating whether there is an overlap between the $i^{th}$ and $j^{th}$ sectors in the set or what extent the $i^{th}$ and $j^{th}$ sectors overlap; and (3) Neighbor(i) for representing the neighbor sectors of the $i^{th}$ sector (For example, in FIGS. 1a and 1b, sectors 102B and 103C are regarded as the neighbors of sector 101A). Preferably, during the initialization, overlap_i,j is set as "0" for indicating that the $i^{th}$ and $j^{th}$ sectors are not overlapped regardless of what the overlapping is like.

Then, at step S220, the BSC obtains the FL load conditions in the area covered by the set of adjacent sectors. In the present embodiment, the FL load conditions may be represented by resources available for setting up a call by the BSs in the set. More preferably, the resources are associated with at least one of the following aspects: channel element (CE), quasi-orthogonal function (QoF) codes, or BS power in the sectors.

As an example, a FL load condition for a sector may be indicated as follows:

$$R\_residual = R\_Notused / R\_total \quad (1)$$

wherein R_residual denotes an availability of the resources for one of the sectors, e.g., sector 101A, in the set, R_NotUsed denotes the resources for this sector that have not been used, and R_total denotes the resources for this sector in total.

In the case where the resources are represented by a plurality of aspects, such as channel element (CE), quasi-orthogonal function (QoF) codes, and BS power in the sectors, a FL load condition may be indicated as follows:

$$R\_residual = Min(R^{(k)}\_Notused / R^{(k)}\_total) \quad (2)$$

wherein R_residual denotes an availability of the resources for one of the sectors in the set, $R^{(k)}$_NotUsed denotes the $k^{th}$ aspect of the resources for this sector that have not been used, and $R^{(k)}$_total denotes the $k^{th}$ aspect of the resources for this sector in total. That is, the load condition is represented by one aspect having the minimum value.

The BSC may obtain the FL load conditions of each sector in the set by searching for a database. To this end, a BS will report its load condition to the BSC whenever it set up or release a call and then the database will update the stored condition with the reported condition. Alternatively, at this step, the BSC may query the BSs, e.g., that governs cells 101-103 of FIGS. 1a and 1b respectively, about their load conditions. As a response, those BSs report the load conditions to the BSC.

At step S230, the BSC determines whether a distribution of the FL load conditions in the area covered by the set of adjacent sectors deviates from a predetermined equilibrium. In the present embodiment, this is accomplished by checking whether there is a busy sector which is deficient in resources and its neighbor sector(s) have sufficient resources to take over some UTs of the busy sector at the boundaries. Note that the equilibrium state may be determined based on a variety of rules. For example, the BSC may regard the following state as being in nonequilibrium, where the busy sector has an availability of the resources being less than a first threshold, e.g., R_residual<10%, and each of the neighbor sectors has an availability of the resources being greater than a second threshold, e.g., R_residual_j>20%.

If it is determined that the deviation occurs, the process proceeds to step S240 for adjusting the coverages of the busy sector and its neighbor sector(s), which will be described in detail with reference to FIG. 3; otherwise, the process proceeds to step S250, waiting for a period to restart the load balancing.

Figure 3:
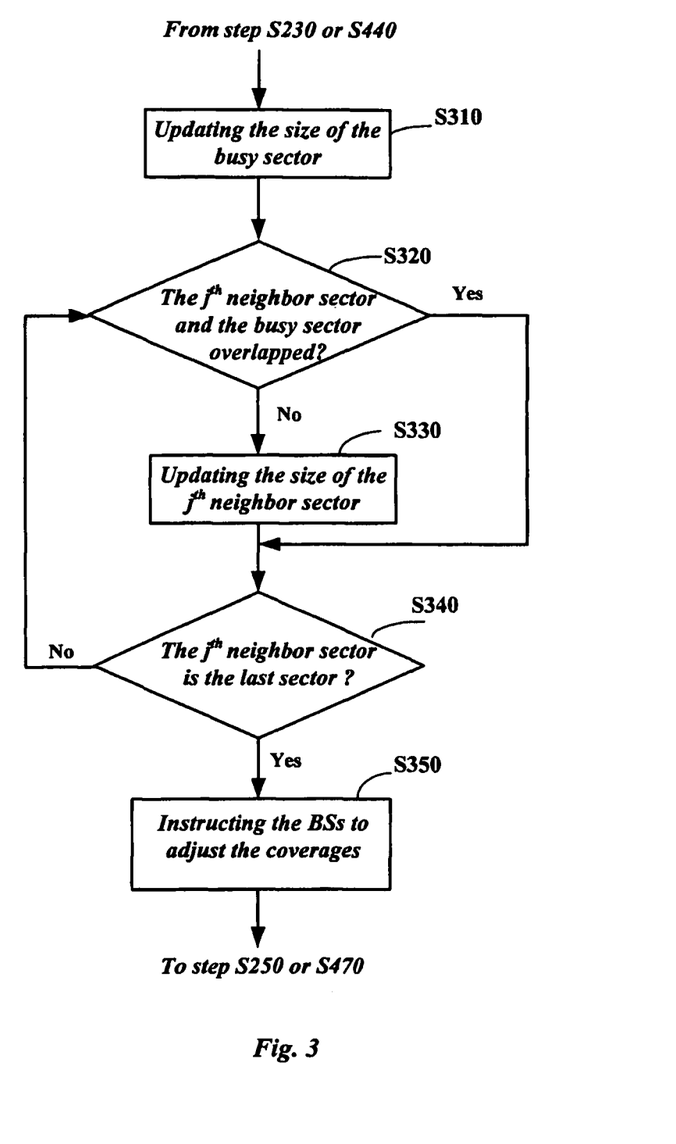
FIG. 3 is a flowchart illustrating steps for adjusting coverages of sectors in the method as shown in FIG. 2.

FIG. 3 is a flowchart illustrating steps for adjusting coverages of sectors in the method as shown in FIG. 2.

With reference to FIG. 3, at step S310, the BSC updates the size or range and the pilot power of the busy sector, e.g., the $i^{th}$ sector, as follows:

$$r\_i(t) = r\_i(t-1) - \Delta d_1 \quad (3)$$

$$E\_pilot\_i(t) = h \times E\_pilot\_i(t-1) \quad (4)$$

wherein r_i(t) and r_i(t−1) denote the updated and current size or range of the $i^{th}$ sector respectively, $\Delta d_1$ denotes what extent the $i^{th}$ sector shrinks and can be determined relying on or derived from observation or experiment; E_pilot_i(t) and E_pilot_i(t−1) denote the updated pilot power of the $i^{th}$ sector and the current pilot power of the $i^{th}$ sector respectively.

As for the factor h, it can be obtained as follows. Assuming that the Path Loss model at 1900 GHz as:

$$P(d) = 28.6 + 35 \log 10(d) \quad (5)$$

where d is the distance from a UT to a BS and P is the reduction of the power in dB at the distance d.

As a result, d, P and h may have the following relationship:

$$\frac{P}{h * P} = \left(\frac{d}{d - \Delta d_1}\right)^\alpha \quad (6)$$

where $\alpha$ is a constant and is set as 3.5 when the above Path Loss model as shown in equation (5) is applied.

When d is set as r_i(t), equation (5) can be represented as follows:

$$h = \left(\frac{r\_i(t) - \Delta d}{r\_i(t)}\right)^\alpha \quad (7)$$

Therefore, h can be considered as a reduction factor in terms of the pilot power if the size of the sector is reduced by $\Delta d_1$.

At step S320, a determination is made as to whether the $j^{th}$ neighbor sector shall be expanded. This can be performed by determining whether the $i^{th}$ neighbor sector and the $i^{th}$ sectors or the busy sector are overlapped or indicated as being in overlapped state, e.g., whether the parameter overlap_i,j is greater than 0. Alternatively, the determination can be made based on what extent the $j^{th}$ neighbor sector and $i^{th}$ sectors are overlapped.

The process will proceed to step S340 if the two sectors are overlapped or significantly overlapped; otherwise, the BSC will expand the $j^{th}$ neighbor sector at step S330. This intends for preventing the formation of a coverage hole within the area covered by the set of the adjacent sectors.

At step S330, the BSC updates the size or range and the pilot power of the $j^{th}$ neighbor sector as follows:

$$r\_j(t)=r\_j(t-1)+\Delta d_2 \quad (8)$$

$$E\_pilot\_j(t)=f\times E\_pilot\_j(t-1) \quad (9)$$

wherein r_j(t) and r_j(t−1) denote the updated and current size or range of the $j^{th}$ neighbor sector respectively, $\Delta d_2$ denotes what extent the $j^{th}$ neighbor sector expands and can be set as $\Delta d_1$ or determined relying on or derived from observation or experiment; E_pilot_j(t) and E_pilot_j(t−1) denote the updated pilot power of the $j^{th}$ neighbor sector and the current pilot power of the $j^{th}$ neighbor sector respectively.

The factor f can be obtained in a similar manner. That is, r_j(t) and $\Delta d_2$ may have the following relationship:

$$f = \left(\frac{r\_j(t)+\Delta d_2}{r\_j(t)}\right)^\alpha \quad (9)$$

where α is a constant and is set as 3.5 when the above Path Loss model as shown in equation (5) is applied. Therefore, f can be considered as an expansion factor in terms of the pilot power if the size of the sector is increased by $\Delta d_2$.

At step S340, if the $j^{th}$ neighbor sector is the last one of the neighbor sectors, the process will proceed to step S350, where the BSC instructs the BSs to adjust the coverages of the involved sectors based on the updated pilot power obtained at steps S310 and S330 and then returns to step S250; otherwise, repeating steps S320-340 on the $(j+1)^{th}$ neighbor sector of the neighbor sectors.

It shall be noted that the process described with reference to FIGS. 2 and 3 may be repeatedly performed until the availability of resources of the busy sector returns above the normal level (e.g., R_residual of the busy sector is greater than 10%) or its neighbor sectors have no spare resources any more (e.g., R_residual of each of the neighbor sectors is equal or less than a third threshold, e.g., 20% or 15%).

Figure 4:
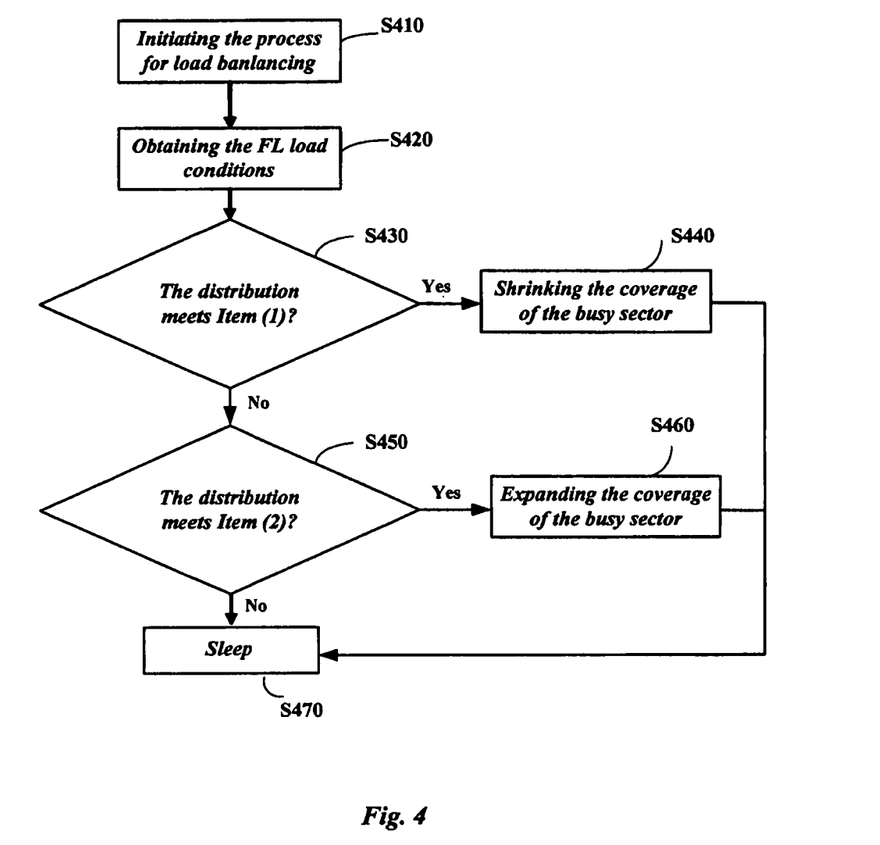
FIG. 4 is a process flow diagram of a method for load balancing according to another exemplary embodiment of the present invention.

FIG. 4 is a process flow diagram of a method for load balancing according to another exemplary embodiment of the present invention.

With reference to FIG. 4, at step S410, a BSC is triggered by the event that the T_range_tune timer times out to initiate the process for load balancing. Likewise, at this step, BSC initializes parameters for a set of adjacent sectors, e.g., sectors 101A, 102B and 103C in FIGS. 1a and 1b, and resets the timer. The example of the parameters as described above is also applicable to the present embodiment.

Then, at step S420, the BSC obtains the FL load conditions in the area covered by the set of adjacent sectors. The FL load conditions may be represented in a similar form as described above. Moreover, the BSC may obtain the FL load conditions of each in the set by searching for a database or querying the BSs about their load conditions.

However, in this embodiment, the following rule is applied to determine whether the deviation of the distribution occurs:

if
(1) one of the adjacent sectors has an availability of the resources being less than a first threshold, e.g., R_residual<10%, and each of its neighbor sectors has an availability of the resources being greater than a second threshold, e.g., R_residual_j>20%; or
(2) one of the adjacent sectors, which was previously considered as a busy sector and thus shrinked, has an availability of the resources being greater than a fourth threshold, e.g., R_residual>50%, and its current coverage is less than its initial coverage, e.g., represented with r_i_init, the distribution deviates from the equilibrium state.

Therefore, at step S430, the BSC determines whether the distribution meets Item (1), i.e., there is a busy sector having an availability of the resources being less than a first threshold, and each of its neighbor sectors has an availability of the resources being greater than a second threshold. If it is the case, the process proceeds to step S440 for expanding the busy sector and shrinking its neighbor sector(s), which has been described with reference to FIG. 3; otherwise, proceeding to step S450.

Next, at step S450, the BSC further determines whether the distribution meets Item (2), i.e., the previously busy sector has an availability of the resources being greater than a fourth threshold, e.g., R_residual>50%. If it is the case, the process proceeds to step S460 for adjusting the coverages of the adjacent sectors in the set, which will be described with reference to FIG. 5; otherwise, proceeding to step S470, waiting for a period to restart the load balancing.

Figure 5:
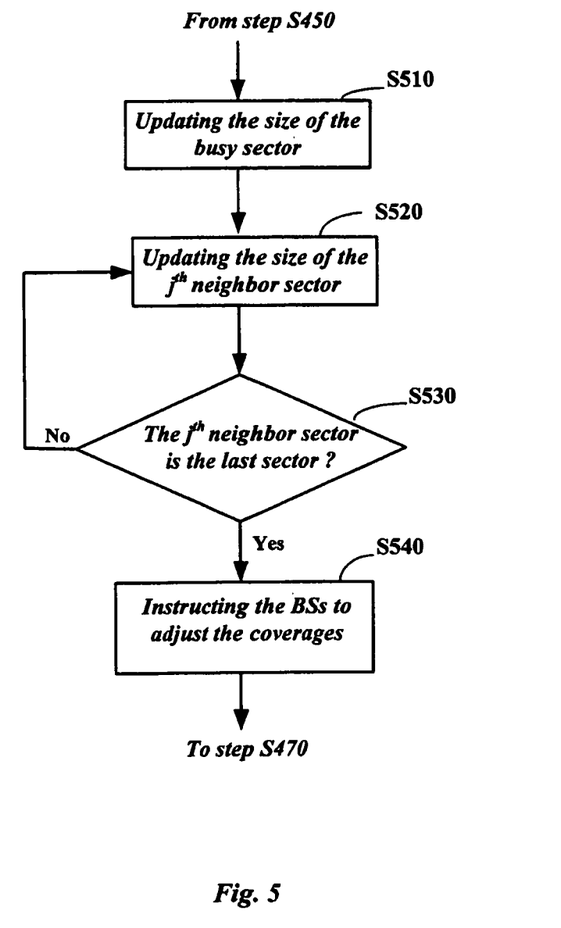
FIG. 5 is a flowchart illustrating steps for adjusting coverages of sectors in the method as shown in FIG. 4.

FIG. 5 is a flowchart illustrating steps for adjusting coverages of sectors in the method as shown in FIG. 4.

With reference to FIG. 5, at step S510, the BSC updates the size or range and the pilot power of the previously busy sector, e.g., the $i^{th}$ sector as follows:

$$r\_i(t)=r\_i(t-1)+\Delta d_3 \quad (10)$$

$$E\_pilot\_i(t)=h'\times E\_pilot\_i(t-1) \quad (11)$$

wherein r_i(t) and r_i(t−1) denote the updated and current size or range of the $i^{th}$ sector respectively, $\Delta d_3$ denotes what extent the $i^{th}$ sector expands and can be determined relying on or derived from observation or experiment; E_pilot_i(t) and E_pilot_i(t−1) denote the updated pilot power of the $i^{th}$ sector and the current pilot power of the $i^{th}$ sector respectively.

As for the factor h', it can be obtained by using the Path Loss model as described above. Therefore, h' can be determined as follows:

$$h' = \left(\frac{r\_i(t)+\Delta d_3}{r\_i(t)}\right)^\alpha \quad (12)$$

where α is a constant and is set as 3.5 when the above Path Loss model as shown in (5) is applied. Therefore, h' can be considered as an expansion factor in terms of the pilot power if the size of the sector is increased by $\Delta d_3$.

At step S520, the BSC updates the size or range and the pilot power of the $j^{th}$ neighbor sector as follows:

$$r\_j(t)=r\_j(t-1)-\Delta d_4 \quad (13)$$

$$E\_pilot\_j(t)=f\times E\_pilot\_j(t-1) \quad (14)$$

wherein r_j(t) and r_j(t−1) denote the updated and current size or range of the $j^{th}$ neighbor sector respectively, $\Delta d_a$ denotes what extent the $j^{th}$ neighbor sector shrinks and can be set as $\Delta d_3$ or determined relying on or derived from observation or experiment; E_pilot_j(t) and E_pilot_j(t−1) denote the updated pilot power of the $j^{th}$ neighbor sector and the current pilot power of the $j^{th}$ neighbor sector respectively.

Likewise, the factor f' can be obtained as follows:

$$f' = \left(\frac{r\_j(t) + \Delta d_4}{r\_j(t)}\right)^\alpha \quad (15)$$

where α is a constant and is set as 3.5 when the above Path Loss model as shown in equation (5) is applied. Therefore, f' can be considered as a shrinking factor in terms of the pilot power if the size of the sector is increased by $\Delta d_4$.

In this step, the shrinking is performed on the neighbor sectors and thus improves efficiency of resources usage.

At step S530, if the $j^{th}$ neighbor sector is the last one of the sectors, the process will proceed to step S540, where the BSC instructs the BSs to adjust the coverages of the involved sectors based on the updated pilot power obtained at steps S510 and S520 and then returns to step S470; otherwise, repeating step S520 on the $(j+1)^{th}$ neighbor sector of the neighbor sectors.

It shall be noted that the process described with reference to FIGS. 4 and 5 may be repeatedly performed to keep the distribution in the equilibrium state.

Figure 6:
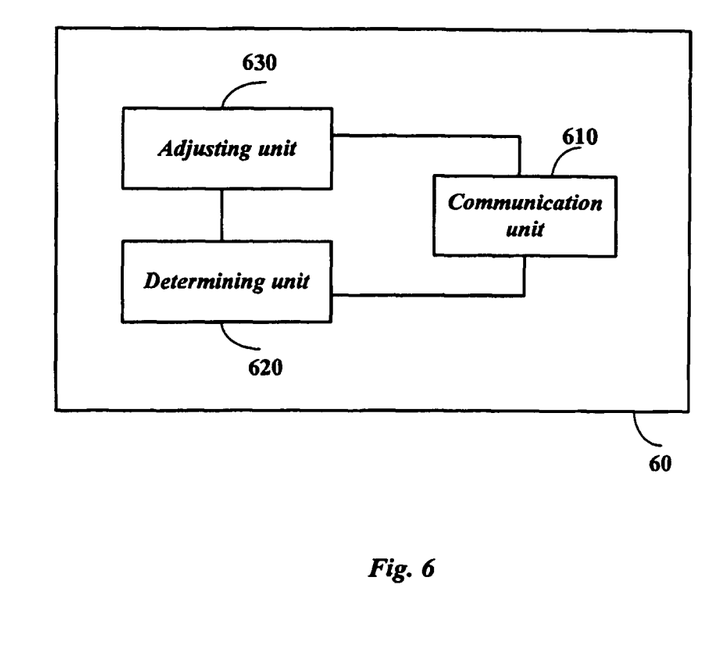
FIG. 6 is a block diagram illustrating one exemplary embodiment of an apparatus for load balancing in a cellular communication system according to the present invention.

FIG. 6 is a block diagram illustrating one exemplary embodiment of an apparatus for load balancing in a cellular communication system according to the present invention.

With reference to FIG. 6, in this embodiment, the apparatus 60 comprises a communicating unit 610, a determining unit 620 and an adjusting unit 630 coupled to each other.

The communication unit 610 is configured to communicate with network entities such as a BS or a database. For example, it can query a plurality of BSs to obtain the load conditions within an area covered by a set of adjacent sectors. Alternatively, it can receive the load conditions from a database.

The determining unit 620 is configured to determine whether a distribution of the FL load conditions deviates from a predetermined equilibrium. For example, it can be configured to perform steps S230 as shown in FIG. 2 and steps S430 and S450 as shown in FIG. 4. Note that the unit 620 or the determining functionality may be arranged outside the apparatus 60. With this arrangement, the communication unit 610 is further configured to communicate with the external device for determining the distribution.

The adjusting unit 630 is configured to adjust the coverages of the set of the adjacent sectors to make the distribution of their FL load conditions move toward the predetermined equilibrium. For example, it can be configured to perform steps S240 as shown in FIG. 2 and steps S440 and S460 as shown in FIG. 4.

In light of the fact that a BSC has the knowledge of cell topography (e.g., size and shape, or boundary) over the cellular communication network, the apparatus is preferably implemented in the BSC.

It should be noted that the aforesaid embodiments are illustrative of this invention instead of restricting this invention, substitute embodiments may be designed by those skilled in the art without departing from the scope of the claims enclosed. The wordings such as "include", "including", "comprise" and "comprising" do not exclude elements or steps which are present but not listed in the description and the claims. It also shall be noted that as used herein and in the appended claims, the singular forms "a", "an", and "the" include plural referents unless the context clearly dictates otherwise. This invention can be achieved by means of hardware including several different elements or by means of a suitably programmed computer. In the unit claims that list several means, several ones among these means can be specifically embodied in the same hardware item. The use of such words as first, second, third does not represent any order, which can be simply explained as names.

What is claimed is:

1. A method for load balancing in a cellular communication system, comprising:
   receiving forward link load conditions in an area covered by a first sector and at least one second sector adjacent to the first sector, wherein the first and the second sectors belong to different cells, wherein the forward link load conditions are represented by resources available for setting up a call by base stations in the first and the second sectors;
   in response to determining that the first sector has an availability of the resources being less than a first threshold and each of the second sector has an availability of the resources being greater than a second threshold, determining that a distribution of the forward link load conditions deviates from a predetermined equilibrium; and
   adjusting coverages of the first and the second sectors to make the distribution move toward the predetermined equilibrium, wherein adjusting the coverages of the first sector and the second sectors comprises:
      shrinking the coverage of the first sector and expanding the coverage of the second sector not overlapped with the first sector until the availability of the resources for the first sector is greater than the first threshold or until each of the second sector has an availability of the resources being equal or less than a third threshold.

2. The method according to claim 1, wherein the resources are associated with at least one of the following aspects: channel element (CE), quasi-orthogonal function (QoF) codes, or base station power in the first and the second sectors.

3. The method according to claim 1, wherein the forward link load conditions are indicated by:

$$R\_residual = Min(R^{(k)}\_NotUsed/R^{(k)}\_total)$$

wherein R_residual denotes an availability of the resources for the first or the second sector, $R^{(k)}$_NotUsed denotes the $k^{th}$ aspect of the resources for the first or the second sector that have not been used, and $R^{(k)}$_total denotes the $k^{th}$ aspect of the first or the second sector in total.

4. The method according to claim 1, further comprising:
   if the availability of the resources for the first sector returns above a fourth threshold and the coverage of the first sector is less than an initial range, expanding the coverage of the first sector and shrinking the coverage of the second sector.

5. The method according to claim 1, wherein shrinking the coverage comprises decreasing a pilot power of the first sector or the second sector, and expanding the coverage comprises increasing a pilot power of the first sector or the second sector.

6. An apparatus for load balancing in a cellular communication system, comprising:
   a computer operable to:
   receive forward link load conditions in an area covered by a first sector and at least one second sector adjacent to the first sector, wherein the first and the second sectors belong to different cells, wherein the forward link load conditions are represented by resources available for setting up a call by base stations in the first and the second sectors;

in response to determining that the first sector has an availability of the resources being less than a first threshold and each of the second sector has an availability of the resources being greater than a second threshold, determine that a distribution of the forward link load conditions deviates from a predetermined equilibrium; and adjust coverages of the first and the second sectors to make a distribution of the forward link load conditions move toward the predetermined equilibrium if the distribution deviates from a predetermined equilibrium, wherein adjusting the coverages of the first sector and the second sectors comprises:

shrinking the coverage of the first sector and expanding the coverage of the second sector not overlapped with the first sector until the availability of the resources for the first sector is greater than the first threshold or until each of the second sector has an availability of the resources being equal or less than a third threshold.

7. The apparatus according to claim 6, wherein the resources are associated with at least one of the following aspects: channel element (CE), quasi-orthogonal function (QoF) codes, and BTS power in the first and second sectors.

8. The method according to claim 6, wherein the forward link load conditions are indicated by:

$$R\_residual = Min(R^{(k)}\_NotUsed / R^{(k)}\_total)$$

wherein R_residual denotes an availability of the resources for the first or the second sector, $R^{(k)}$_NotUsed denotes the $k^{th}$ aspect of the resources for the first or the second sector that have not been used, and $R^{(k)}$_total denotes the $k^{th}$ aspect of the first or the second sector in total.

9. The apparatus according to claim 6, wherein the adjusting unit is further configured to expand the coverage of the first sector and shrink the coverage of the remaining second sector if the availability of the resources for the first sector returns above a fourth threshold and the coverage of the first sector is less than an initial range.

10. The apparatus according to claim 6, wherein the adjusting unit is configured to shrink the coverage by decreasing a pilot power of the first sector or the second sector, and expand the coverage by increasing a pilot power of the first sector or the second sector.

\* \* \* \* \*